Jan. 1, 1963   W. J. MOULDS, JR   3,071,269
MULTIPLE STORE CRADLE LIFT FOR SPECIAL WEAPONS
Filed Nov. 28, 1960
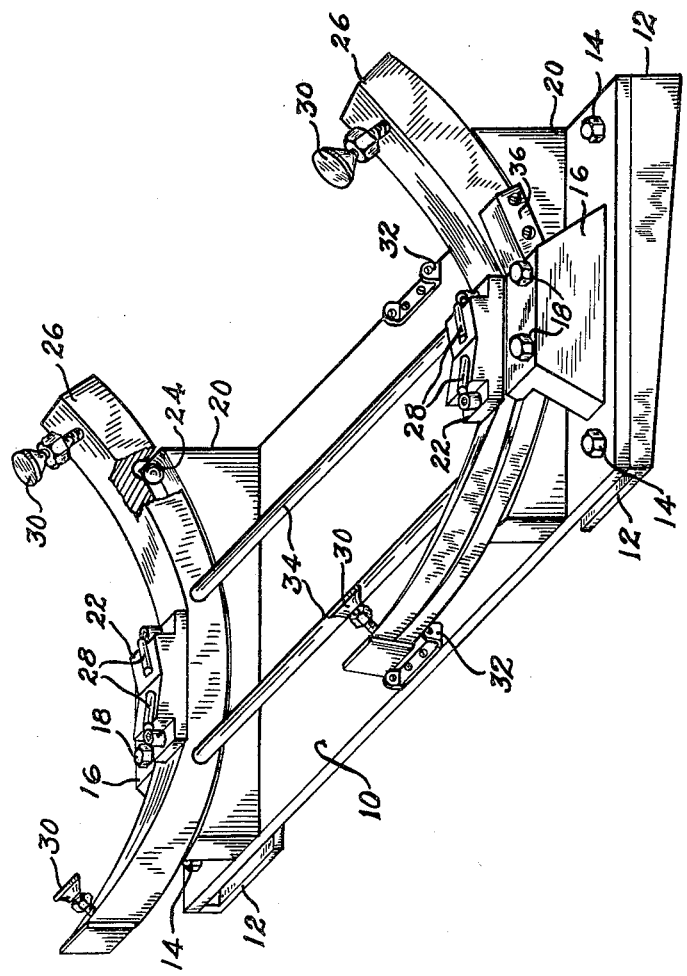
INVENTOR.
WILLIAM J. MOULDS JR.
BY
Wade Loomey
Sherman H. Goldman
ATTORNEYS 3,071,269
MULTIPLE STORE CRADLE LIFT FOR
SPECIAL WEAPONS
William J. Moulds, Jr., Albuquerque, N. Mex., assignor to the United States of America as represented by the Secretary of the Air Force
Filed Nov. 28, 1960, Ser. No. 72,256
1 Claim. (Cl. 214—621)
(Granted under Title 35, U.S. Code (1952), sec. 266)

The invention described herein may be manufactured and used by or for the United States Government for governmental purposes without payment to me of any royalty thereon.

This invention relates to pallets for fork lift trucks and is especially concerned with pallets for handling military special weapons of a generally cylindrical shape.

In handling special weapons, such as bombs or missiles, around an airfield or a bomber base, it is necessary to exercise extreme care lest the delicate guidance and control instruments in the missile be damaged. The task of handling is complicated by the fact that the skin of the missile is thin and easily deformed and the missile is of cylindrical shape and thus apt to roll off of the usual flat bedded pallet. Fork lifts are common around airfields and so are overhead wrecking cranes. A pallet designed to handle cylindrical objects which could be used with these common airfield accessories would be advantageous.

It is an object of this invention, therefore, to provide a pallet for handling cylindrical objects which can be used with common fork lifts or with modified wrecking cranes.

It is a further object to provide a pallet with arcuate stanchions which can be rotated through an arc to permit rolling a cylindrical load thereon.

It is a still further object to provide a pallet for a cylindrical load on which the load may be easily shifted in a longitudinal direction on the pallet for balance or for storing.

This invention consists essentially of two arcuate stanchions forming a cradle for holding a heavy cylindrical load supported on ball bearings in a plate, or pallet, designed to fit the prongs of a fork lift. The cradle may be rocked 45° from the upright position so that the ends of the stanchions will be level with the floor of the pallet. The pallet is provided with a nylon strap to hold the load in place and with rollers to permit the movement of the load in a longitudinal direction for better balance or for unloading. The stanchions are provided at the ends with jack screws with padded tips forming sway braces to accommodate the cradle to various size stores.

The great advantage of this pallet over any now known is that the cradle can be rocked through an arc of 45° so that the ends of the two arcuate stanchions will be substantially even with the pallet floor and cylindrical stores, or loads, can be easily rolled in place, the cradle rocked back to the upright position, the store positioned on the rollers to a state of balance and the nylon strap fastened to hold the store firmly in place. This saves lifting the store and the consequent labor or apparatus for so doing.

The above and other advantages, features and objects of the invention will become more apparent from the following description taken in connection with the illustrative embodiment in the accompanying drawing, wherein:

The pallet comprises a base 10 with two fork lift clamps 12 secured underneath the base by bolts 14. Two cradle clamps 16 are shown fastened to the base 10 by bolts 18 and two cradle mounts 20 are shown supporting cradle arms 26 which ride on ball bearings 24 positioned in a race in said cradle mounts. Two bearing retainers 22 secured to cradle arms 26 are shown holding roller bearings 28 in place. Four jack screws with pads are shown at 30 secured to cradle arms 26 in order to act as sway braces, which can be positioned to fit various size loads. Nylon strap assemblies 32 are designed to hold a nylon strap, not shown, to hold a store, or load, in place. A pair of bracing rods 34 serve to hold the two arms 26 in alignment and two stops 36, one on each arm, keep the cradle from rocking to and fro and permit it to be positioned at balance when the said stop rests against the cradle clamp 16. Jack screws 30 prevent the cradle arms 26 from being rotated out of the cradle mount 20.

In use the pallet is moved alongside the cylindrical weapon to be stored, the cradle is rocked so that the ends of the arms remote from the stops are level with, or approximately level with, the weapon to be moved, the weapon is rolled on the cradle, the arms are raised until the stops prevent further movement, the weapon is moved longitudinally until balanced, the nylon strap is made fast and the pallet with the weapon is ready for the fork lift. In unloading or storing the weapon it is merely necessary to loosen the nylon strap, slide the weapon on the rollers into storage or lower the cradle and allow it to roll off on the floor. Its great advantage is that it is an easily loaded, safe means for holding a cylindrical weapon on a pallet which can be picked up and carried by an ordinary fork lift truck which are already in use on airfields.

What I claim is:

A cradle lift for generally cylindrical objects comprising a pallet forming a base, a pair of fork lift clamps secured to said base and arranged for engagement with the forks of a fork lift truck, a pair of cradle mounts having arcuate upper portions, said cradle mounts being secured to said base in a spaced relationship wherein the central axis of each of said arcuate portions is horizontal and in alignment, a pair of arcuate cradles matching the curvature of said arcuate upper portions of said cradle mounts, ball bearing means rotatably mounting each cradle to a cradle mount, alignment rod means interconnecting said cradles for aiding conjoint rotation of said cradle mounts, roller bearings centrally located in each of said cradles for allowing longitudinal movement of a cylindrical object along the longitudinal axis of said cradles, clamping means connected with said base and said cradles for selectively inhibiting rotation of said cradles, a pair of adjustable means mounted on each of said cradles for engagement with said object to be stored for providing three point support of said cylindrical object with said last-mentioned roller bearings, and strap means connected with said cradles for clamping said cylindrical object to said cradles.

References Cited in the file of this patent
UNITED STATES PATENTS

| | | |
|---|---|---|
| 2,424,692 | Harshberger | July 29, 1947 |
| 2,479,623 | Johnson | Aug. 23, 1949 |
| 2,620,930 | Mullgardt | Dec. 9, 1952 |
| 2,712,874 | Murray | July 12, 1955 |
| 2,796,226 | Dalton et al. | June 18, 1957 |
| 2,851,235 | Henig | Sept. 9, 1958 |
| 2,901,208 | Jones | Aug. 25, 1959 |
| 2,921,784 | Miller | Jan. 19, 1960 |